US006053189A

United States Patent [19]

Longenecker et al.

[11] Patent Number: 6,053,189

[45] Date of Patent: Apr. 25, 2000

[54] MOBILE LEG SUPPORT DEVICE

[76] Inventors: Lisa M. Longenecker, R.D. 2 Box 4191, Jonestown, Pa. 17038; Nancy J. Sunderland, 1413 Warren Dr., Lebanon, Pa. 17042

[21] Appl. No.: 08/974,047

[22] Filed: Nov. 19, 1997

[51] Int. Cl.[7] .............................. A63H 3/00; B62M 1/00

[52] U.S. Cl. .......................... 135/67; 482/68; 280/87.04; 280/87.041; 297/5

[58] Field of Search ................................ 135/67, 85, 66, 135/65, 69, 76; 280/87.01, 87.041, 87.021, 87.05; 297/5, DIG. 4, 423.1, 423.11, 423.12, 423.16; 482/66, 68

[56] References Cited

U.S. PATENT DOCUMENTS

| | | |
|---|---|---|
| Re. 24,817 | 4/1960 | Hogan . |
| D. 153,735 | 5/1949 | Staudt et ala. . |
| 1,361,102 | 12/1920 | Scott . |
| 1,448,783 | 3/1923 | Blewitt et al. . |
| 1,743,904 | 1/1930 | Russell . |
| 2,222,678 | 11/1940 | Mittleburg et al. . |
| 2,362,466 | 11/1944 | Carter . |
| 2,652,097 | 9/1953 | Warren . |
| 3,633,967 | 1/1972 | Timmins . |
| 5,131,715 | 7/1992 | Balles . |
| 5,364,120 | 11/1994 | Shimansky . |
| 5,725,275 | 3/1998 | Wigfall . |
| 5,800,317 | 9/1998 | Accetta . |
| 5,816,593 | 10/1998 | Che . |
| 5,839,740 | 11/1998 | Seeger . |

OTHER PUBLICATIONS

World Wide Web page of the Roll–A–Bout Corporation describing the "Roll–A–Bout" printout as of Aug. 11, 1999. Roll–A–Bout Corporation, 1124 Charles Drive, Dover, Delaware 19904.

*Primary Examiner*—Robert Canfield

[57] ABSTRACT

A new Mobile Leg Support Device for supporting one leg of a user bent at the knee while allowing the user to stand on the other leg and move the device about. The inventive device includes a wheeled base, a pair of spaced uprights extending upward from the wheeled base, a leg support member extending between the spaced uprights for supporting one leg of a user bent at the knee, and a handle extending between the spaced uprights for supporting the upper body of the user and enabling the user to steer the device. In a preferred embodiment, the leg support member and the handle are each independently height adjustable for accommodating users of varying height.

18 Claims, 2 Drawing Sheets

MOBILE LEG SUPPORT DEVICE

BACKGROUND OF THE INVENTION

1. Field of the Invention

The present invention relates to leg support devices and more particularly pertains to a new Mobile Leg Support Device for supporting one leg of a user bent at the knee while allowing the user to stand on the other leg and move the device about.

2. Description of the Prior Art

The use of leg support devices is known in the prior art. More specifically, leg support devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art leg support devices include U.S. Pat. No. 5,411,035; U.S. Pat. No. 5,380,021; U.S. Pat. No. 4,909,264; U.S. Pat. No. D328,477; U.S. Pat. No. 4,552,372; and U.S. Pat. No. 5,158,313.

While these devices fulfill their respective, particular objectives and requirements, the aforementioned patents do not disclose a new Mobile Leg Support Device. The inventive device includes a wheeled base, a pair of spaced uprights extending upward from the wheeled base, a leg support member extending between the spaced uprights for supporting one leg of a user bent at the knee, and a handle extending between the spaced uprights for supporting the upper body of the user and enabling the user to steer the device. In a preferred embodiment, the leg support member and the handle are each independently height adjustable for accommodating users of varying height.

In these respects, the Mobile Leg Support Device according to the present invention substantially departs from the conventional concepts and designs of the prior art, and in so doing provides an apparatus primarily developed for the purpose of supporting one leg of a user bent at the knee while allowing the user to stand on the other leg and move the device about.

SUMMARY OF THE INVENTION

In view of the foregoing disadvantages inherent in the known types of leg support devices now present in the prior art, the present invention provides a new Mobile Leg Support Device construction wherein the same can be utilized for supporting one leg of a user bent at the knee while allowing the user to stand on the other leg and move the device about.

The general purpose of the present invention, which will be described subsequently in greater detail, is to provide a new Mobile Leg Support Device apparatus and method which has many of the advantages of the leg support devices mentioned heretofore and many novel features that result in a new Mobile Leg Support Device which is not anticipated, rendered obvious, suggested, or even implied by any of the prior art leg support devices, either alone or in any combination thereof.

To attain this, the present invention generally comprises a wheeled base, a pair of spaced uprights extending upward from the wheeled base, a leg support member extending between the spaced uprights for supporting one leg of a user bent at the knee, and a handle extending between the spaced uprights for supporting the upper body of the user and enabling the user to steer the device. In a preferred embodiment, the leg support member and the handle are each independently height adjustable for accommodating users of varying height.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new Mobile Leg Support Device apparatus and method which has many of the advantages of the leg support devices mentioned heretofore and many novel features that result in a new Mobile Leg Support Device which is not anticipated, rendered obvious, suggested, or even implied by any of the prior art leg support devices, either alone or in any combination thereof.

It is another object of the present invention to provide a new Mobile Leg Support Device which may be easily and efficiently manufactured and marketed.

It is a further object of the present invention to provide a new Mobile Leg Support Device which is of a durable and reliable construction.

An even further object of the present invention is to provide a new Mobile Leg Support Device which is susceptible of a low cost of manufacture with regard to both materials and labor, and which accordingly is then susceptible of low prices of sale to the consuming public, thereby making such Mobile Leg Support Device economically available to the buying public.

Still yet another object of the present invention is to provide a new Mobile Leg Support Device which provides in the apparatuses and methods of the prior art some of the advantages thereof, while simultaneously overcoming some of the disadvantages normally associated therewith.

Still another object of the present invention is to provide a new Mobile Leg Support Device for supporting one leg of a user bent at the knee while allowing the user to stand on the other leg and move the device about.

Yet another object of the present invention is to provide a new Mobile Leg Support Device which includes a wheeled base, a pair of spaced uprights extending upward from the wheeled base, a leg support member extending between the spaced uprights for supporting one leg of a user bent at the knee, and a handle extending between the spaced uprights for supporting the upper body of the user and enabling the user to steer the device. In a preferred embodiment, the leg support member and the handle are each independently height adjustable for accommodating users of varying height.

Still yet another object of the present invention is to provide a new Mobile Leg Support Device that provides a person who has an injured leg with a greater degree of mobility.

Even still another object of the present invention is to provide a new Mobile Leg Support Device that is easily maneuvered by a user.

Even still another object of the present invention is to provide a new Mobile Leg Support Device that allows a user to stand with an injured leg supported while permitting the user free use of his or her hands, arms, and upper body.

Even still another object of the present invention is to provide a new Mobile Leg Support Device that provides a safer and less cumbersome alternative to crutches.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
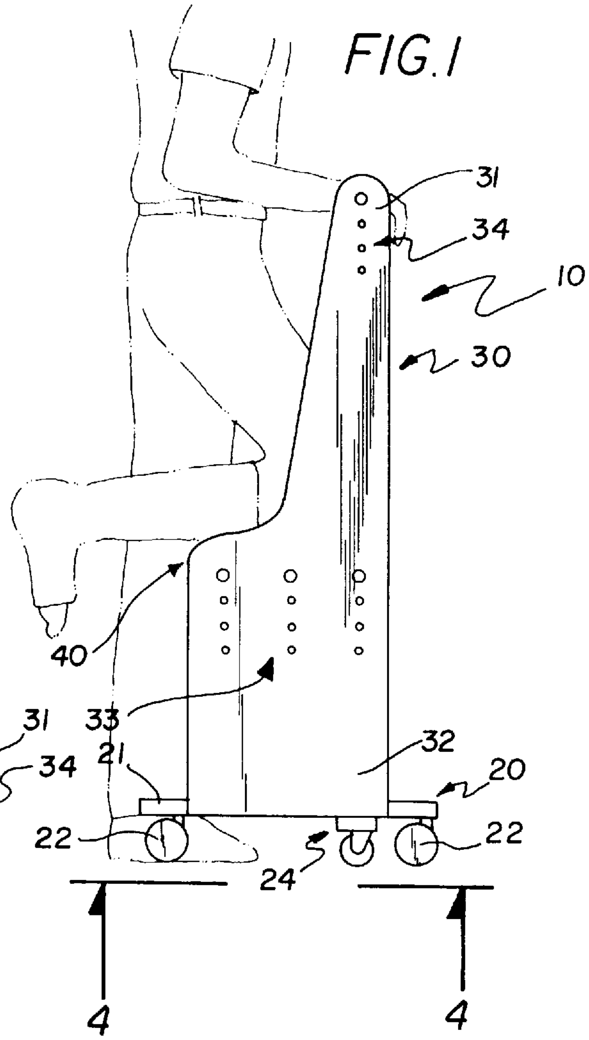
FIG. 1 is a side elevation view of a new Mobile Leg Support Device in use according to the present invention.

With reference now to the drawings, and in particular to FIGS. 1 through 4 thereof, a new Mobile Leg Support Device embodying the principles and concepts of the present invention and generally designated by the reference numeral 10 will be described.

As best illustrated in FIGS. 1 through 4, the Mobile Leg Support Device 10 comprises a wheeled base 20, a pair of spaced uprights 30 extending upward from the wheeled base 20, a leg support member 40 extending between the spaced uprights 30 for supporting one leg of a user bent at the knee, and a handle 50 extending between the spaced uprights 30 for supporting the upper body of the user and enabling the user to steer the Mobile Leg Support Device 10. In a preferred embodiment, the leg support member 40 and the handle 50 are each independently height adjustable for accommodating users of varying height.

The Mobile Leg Support Device 10 is intended for use in supporting a first, injured leg of a user bent at the knee while allowing the user to stand on a second, uninjured leg and move the device 10 about. It should be noted that the Mobile Leg Support Device 10 is essentially symmetrical about a forward-rearward medial axis and, as such, may be used in supporting either the left leg or the right leg of the user.

As best illustrated in FIGS. 1 through 4, the wheeled base 20 comprises a platform 21 and a plurality of caster wheels 22 swivelly attached to an underside of the platform 21 for facilitating multi-directional movement of the Mobile Leg Support Device 10. In a preferred embodiment, the platform 21 is generally rectangular in shape and four caster wheels 22 are swivelly attached to the platform 21 adjacent each of the four corners thereof.

In a preferred embodiment, a wheeled balancing member 24 extends from at least one side of the wheeled base 20 for providing lateral support for the Mobile Leg Support Device 10. The wheeled balancing member 24 comprises a balancing arm 25 secured to the wheeled base 20 and a balancing caster wheel 28 swivelly attached to the balancing arm 25. The balancing arm 25 has an inner end 26 and an outer end 27 wherein the inner end 26 is positioned beneath and secured to the underside of the platform 21 of the wheeled base 20. As such, the outer end 27 of the balancing arm 25 extends beyond one side of the platform 21 of the wheeled base 20. Accordingly, the balancing caster wheel 28 is swivelly attached to an underside of the balancing arm 25 adjacent the outer end 27 thereof.

Figure 4:
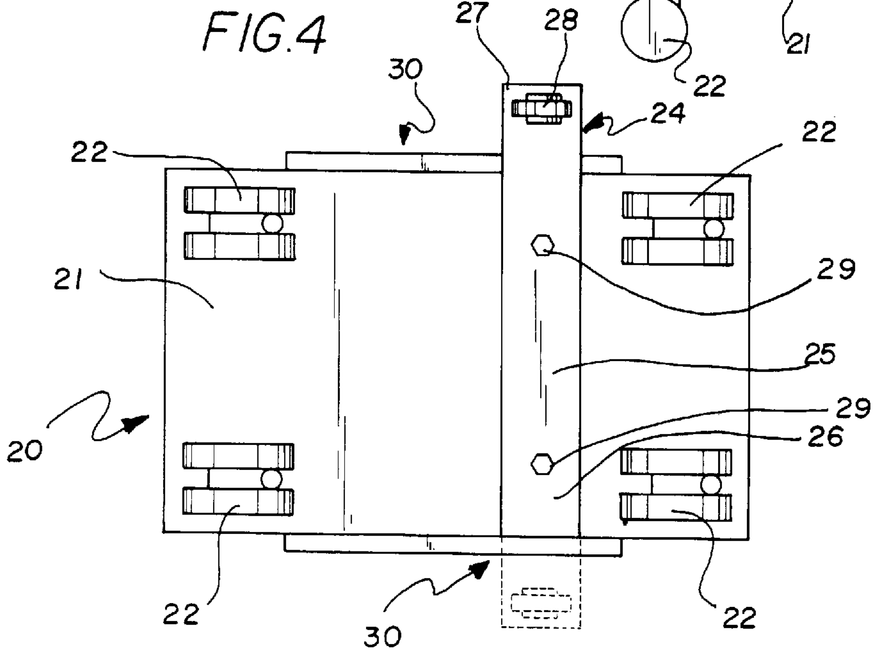
FIG. 4 is a bottom view of the present invention.

Ideally, the wheeled balancing member 24 extends from and provides lateral support to a side of the wheeled base 20 corresponding to the bent leg of the user. For example, when the user is utilizing the Mobile Leg Support Device 10 to support his or her right leg, the wheeled balancing member 24 extends from the right side of the wheeled base 20. Conversely, when the user is utilizing the Mobile Leg Support Device 10 to support his or her left leg, the wheeled balancing member 24 extends from the left side of the wheeled base 20. Accordingly, the wheeled balancing member 24 is removably attached to the platform 21 of the wheeled base 20 such that the outer end 27 of the balancing arm 25 extends beyond one side of the platform 21. As such, the wheeled balancing member 24 may be removed from the platform 21, rotated 180 degrees, and resecured to the platform 21 such that the outer end 27 of the balancing arm 25 extends beyond an opposite side of the platform 21 (FIG. 4). In an illustrative embodiment, the wheeled balancing member 24 is removably attached to the platform 21 by a pair of bolt-nut assemblies 29.

Figure 2:
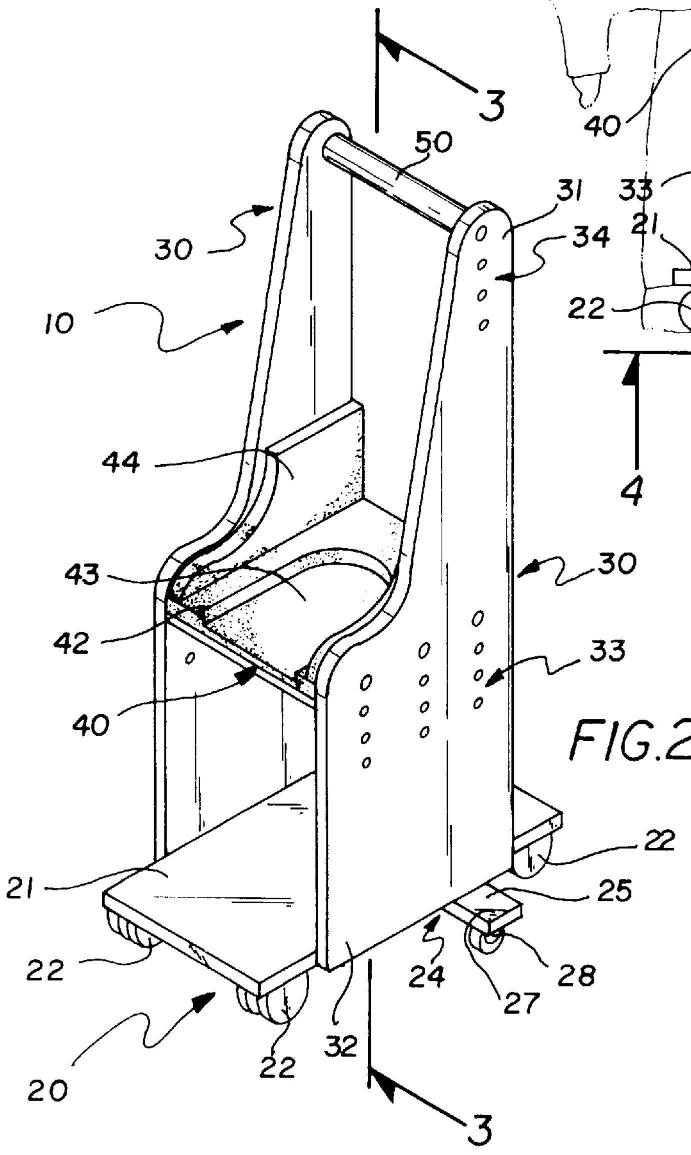
FIG. 2 is an isometric illustration of the present invention.
Figure 3:
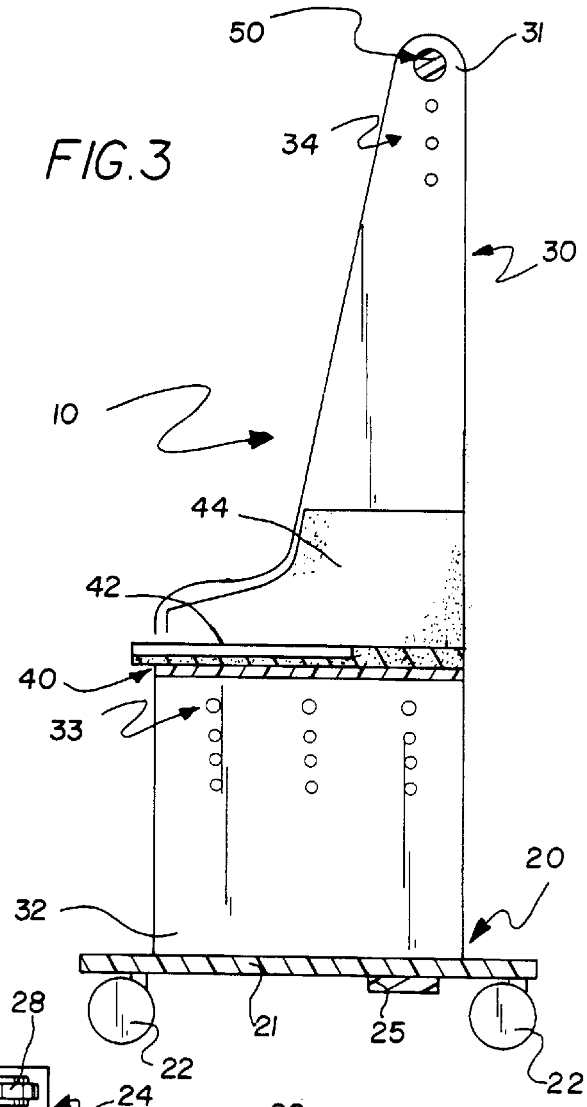
FIG. 3 is a cross sectional view taken along line 3—3 of FIG. 1.

As best illustrated in FIGS. 1 through 3, each of the spaced uprights 30 have an upper end 31 and a lower end 32 wherein the lower end 32 of each of the spaced uprights 30 is secured to one side of the platform 21 of the wheeled base 20. In a preferred embodiment, the spaced uprights 30 extend upward from the wheeled base 20 in a spaced-apart generally parallel relationship. In an illustrative embodiment, the spaced uprights 30 are about 8 inches apart.

As best illustrated in FIGS. 1 through 3, the leg support member 40 is supported between the spaced uprights 30 intermediate the upper ends 31 and the lower ends 32 thereof. Accordingly, the leg support member 40 is positioned directly above the platform 21 of the wheeled base 20 in a spaced-apart generally parallel relationship. Ideally, the leg support member 40 is positioned at a height sufficient for supporting the bent leg of the user while the user stands on his or her other leg. Accordingly, the leg support member 40 is height adjustable. As such, an array of vertically and horizontally aligned leg-support adjustment holes 33 are provided in each of the spaced uprights 30 intermediate the upper ends 31 and the lower ends 32 thereof.

In a preferred embodiment, a bottom support pad 42 is disposed on a top surface of the leg support member 40 and a pair of side support pads 44 are disposed along an inner surface of each of the spaced uprights 30 adjacent the leg support member 40. The bottom support pad 42 and each of the side support pads 44 are formed of a resilient foam material.

As best illustrated in FIGS. 1 through 3, the handle 50 is supported between the spaced uprights 30 adjacent the upper ends 31 thereof. Ideally, the handle 50 is positioned at a height sufficient for supporting the upper body of the user as the user rests his or her bent leg on the leg support member 40 and stands on his or her other leg. Accordingly, the handle 50 is height adjustable. As such, a plurality of vertically aligned handle adjustment holes 34 are provided in each of the spaced uprights 30 adjacent the upper ends 31 thereof.

It is understood that the spaced uprights 30 may be available in various heights to accommodate users of varying height. As such, one set of spaced uprights may accommodate users within one height range and another set of spaced uprights may accommodate users within another height range. Furthermore, as the leg support member 40 and the handle 50 are each independently height adjustable, the Mobile Leg Support Device 10 may be conveniently custom fitted to a particular user.

In use, the leg support member 40 and the handle 50 are adjusted to accommodate the height of the user. Once adjusted, the user bends his or her injured leg at the knee and positions their bent leg between the spaced uprights 30 and rests their bent leg on the leg support member 40. Accordingly, the user stands on his or her other leg and places their hand on the handle 50 to support their upper body.

To propel and move the device about, the user shifts his or her weight to their bent leg, which is being supported by the leg support member 40, and steps with his or her unsupported leg in a normal walking motion. Thereafter, the user shifts his or her weight to their unsupported leg and moves the device with their supported leg. The user may steer the device by grasping the handle 50 and exerting sidewardly directed forces while moving the device with their supported leg. In addition, the user may steer the device by exerting sidewardly directed forces with their supported leg while moving the device with their supported leg. Consequently, with the Mobile Leg Support Device 10, the user continues to utilize and exercise the upper leg muscles of his or her injured leg without putting their weight on the injured leg.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A mobile leg support device for supporting a first leg of a user bent at the knee while allowing said user to stand on a second leg and move said device about, said device comprising:

a wheeled base;

a wheeled balancing member extending from at least one side of said wheeled base;

a pair of spaced uprights extending upward from said wheeled base;

a leg support means extending between said pair of spaced uprights for supporting said first leg of said user when said user stands on said second leg; and a handle extending between said pair of spaced uprights above said leg support means.

2. The mobile leg support device of claim 1, wherein said wheeled base comprises:

a platform, and a plurality of caster wheels depending from said platform.

3. The mobile leg support device of claim 2, wherein said platform is generally rectangular in shape, and wherein four caster wheels are swivelly attached to an underside of said platform adjacent the four corners thereof.

4. The mobile leg support device of claim 1, wherein said wheeled balancing member comprises:

a balancing arm secured to said wheeled base, said balancing arm having an outer end, said outer end extending beyond one side of said wheeled base, and a balancing caster wheel depending from said balancing arm adjacent said outer end thereof.

5. The mobile leg support device of claim 4, wherein said wheeled balancing member is removably attached to said wheeled base whereby said wheeled balancing member may be rotated 180 degrees wherein said outer end of said balancing arm extends beyond an opposite side of said wheeled base.

6. The mobile leg support device of claim 1, wherein said leg support means comprises:

a leg support shelf supported between said pair of spaced uprights.

7. The mobile leg support device of claim 6, further comprising:

a bottom support pad disposed on a top surface of said leg support shelf, and a pair of side support pads each disposed on an inner surface of one of said pair of spaced uprights adjacent said leg support shelf.

8. The mobile leg support device of claim 1, wherein said leg support means is height adjustable.

9. The mobile leg support device of claim 1, wherein said handle is height adjustable.

10. A mobile leg support device for supporting a first leg of a user bent at the knee while allowing said user to stand on a second leg and move said device about, said device comprising:

a platform;

a wheeled balancing member extending from at least one side of said platform;

a plurality of caster wheels depending from said platform;

a pair of spaced uprights each having an upper end and a lower end, said lower end of each of said pair of spaced uprights being secured to one side of said platform, said pair of spaced uprights extending upward from said platform in a spaced-apart generally parallel relationship;

a leg support member supported between said pair of spaced uprights intermediate said upper ends and said lower ends thereof, said leg support member being positioned above said platform in a spaced-apart generally parallel relationship, said leg support member being positioned at a height sufficient for supporting said first leg of said user when said user stands on said second leg; and a handle supported between said pair of spaced uprights adjacent said upper ends thereof, said handle being positioned at a height sufficient for supporting the upper body of said user when said user positions said first leg on said leg support member and stands on said second leg.

11. The mobile leg support device of claim 10, wherein said platform is generally rectangular in shape, and wherein four caster wheels are swivelly attached to an underside of said platform adjacent the four corners thereof.

12. The mobile leg support device of claim 10, wherein said wheeled balancing member comprises:

a balancing arm secured to said platform, said balancing arm having an outer end, said outer end extending beyond one side of said platform, and a balancing caster wheel depending from said balancing arm adjacent said outer end thereof.

13. The mobile leg support device of claim 12, wherein said wheeled balancing member is removably attached to said platform whereby said wheeled balancing member may be removed from said platform, rotated 180 degrees, and resecured to said platform wherein said outer end of said balancing arm extends beyond an opposite side of said platform.

14. The mobile leg support device of claim 10, further comprising:

a bottom support pad disposed on a top surface of said leg support member, and a pair of side support pads each disposed on an inner surface of one of said pair of spaced uprights adjacent said leg support member.

15. The mobile leg support device of claim 10, wherein each of said pair of spaced uprights have an array of vertically and horizontally aligned leg-support adjustment holes therein intermediate said upper ends and said lower ends thereof whereby said leg support member is height adjustable.

16. The mobile leg support device of claim 10, wherein each of said pair of spaced uprights have a plurality of vertically aligned handle adjustment holes therein adjacent said upper ends thereof whereby said handle is height adjustable.

17. A mobile leg support device for supporting a first leg of a user bent at the knee while allowing said user to stand on a second leg and move said device about, said device comprising:

a platform;

a plurality of caster wheels depending from said platform;

a pair of spaced uprights each having an upper end and a lower end, said lower end of each of said pair of spaced uprights being secured to one side of said platform, said pair of spaced uprights extending upward from said platform in a spaced-apart generally parallel relationship;

a leg support member supported between said pair of spaced uprights intermediate said upper ends and said lower ends thereof, said leg support member being positioned above said platform in a spaced-apart generally parallel relationship, said leg support member being positioned at a height sufficient for supporting said first leg of said user when said user stands on said second leg;

each of said pair of spaced uprights having an array of vertically and horizontally aligned leg-support adjustment holes therein intermediate said upper ends and said lower ends thereof whereby said leg support member is height adjustable; and a handle supported between said pair of spaced uprights adjacent said upper ends thereof, said handle being positioned at a height sufficient for supporting the upper body of said user when said user positions said first leg on said leg support member and stands on said second leg.

18. A mobile leg support device for supporting a first leg of a user bent at the knee while allowing said user to stand on a second leg and move said device about, said device comprising:

a platform;

a plurality of caster wheels depending from said platform;

a pair of spaced uprights each having an upper end and a lower end, said lower end of each of said pair of spaced uprights being secured to one side of said platform, said pair of spaced uprights extending upward from said platform in a spaced-apart generally parallel relationship;

a leg support member supported between said pair of spaced uprights intermediate said upper ends and said lower ends thereof, said leg support member being positioned above said platform in a spaced-apart generally parallel relationship, said leg support member being positioned at a height sufficient for supporting said first leg of said user when said user stands on said second leg; and a handle supported between said pair of spaced uprights adjacent said upper ends thereof, said handle being positioned at a height sufficient for supporting the upper body of said user when said user positions said first leg on said leg support member and stands on said second leg, each of said pair of spaced uprights have a plurality of vertically aligned handle adjustment holes therein adjacent said upper ends thereof whereby said handle is height adjustable.

* * * * *